United States Patent
Huet

(10) Patent No.: US 10,217,276 B2
(45) Date of Patent: Feb. 26, 2019

(54) THREE DIMENSIONAL MODELING

(71) Applicant: 3D SLASH, Paris (FR)

(72) Inventor: Sylvain Huet, Paris (FR)

(73) Assignee: 3D SLASH, Paris (FR)

( * ) Notice: Subject to any disclaimer, the term of this patent is extended or adjusted under 35 U.S.C. 154(b) by 140 days.

(21) Appl. No.: 15/303,962

(22) PCT Filed: Apr. 16, 2015

(86) PCT No.: PCT/EP2015/058340
§ 371 (c)(1),
(2) Date: Oct. 13, 2016

(87) PCT Pub. No.: WO2015/158869
PCT Pub. Date: Oct. 22, 2015

(65) Prior Publication Data
US 2017/0039759 A1 Feb. 9, 2017

(30) Foreign Application Priority Data

Apr. 17, 2014 (EP) .................................... 14165278

(51) Int. Cl.
*G06T 17/00* (2006.01)
*B33Y 50/00* (2015.01)
(Continued)

(52) U.S. Cl.
CPC .......... *G06T 17/005* (2013.01); *B29C 64/386* (2017.08); *B33Y 50/00* (2014.12);
(Continued)

(58) Field of Classification Search
CPC ...... G06T 17/005; G06T 17/00; H04N 19/426
See application file for complete search history.

(56) References Cited

U.S. PATENT DOCUMENTS

| | | | | |
|---|---|---|---|---|
| 4,694,404 A | * | 9/1987 | Meagher | .................. G06T 9/40 |
| | | | | 345/421 |
| 6,597,359 B1 | * | 7/2003 | Lathrop | .................. G06T 15/06 |
| | | | | 345/420 |

(Continued)

FOREIGN PATENT DOCUMENTS

| | | |
|---|---|---|
| EP | 1442869 A1 | 8/2004 |
| WO | 2013117001 A1 | 8/2013 |

OTHER PUBLICATIONS

International Search Report and Written Opinion with regard to PCT/EP2015/058340 dated Aug. 3, 2015.

(Continued)

*Primary Examiner* — Yi Yang
(74) *Attorney, Agent, or Firm* — BCF LLP

(57) ABSTRACT

Systems and methods of creating a 3 Dimensional (3D) model of an object suitable for 3D printing are described. A method comprises defining an initial cuboid of edge lengths Lx, Ly, Lz for creating the 3D model, wherein the initial cuboid implicitly includes inner cuboids such that starting from the initial cuboid each cuboid is recursively splitable into eight identical inner cuboids. Further, the method comprises iteratively, receiving an input specifying a size of an inner cuboid to be modified and a selection of a point on the screen. Based on the received user input, at least one inner cuboid which is to be modified is identified. Once the inner cube to be modified is identified, the inner cube may be modified by marking the at least one inner cuboid as filled or empty.

16 Claims, 7 Drawing Sheets

(51) Int. Cl.
- *G06T 9/00* (2006.01)
- *G06T 9/40* (2006.01)
- *H04N 19/426* (2014.01)
- *B33Y 50/02* (2015.01)
- *G05B 19/4099* (2006.01)
- *G06T 7/60* (2017.01)
- *G06T 17/10* (2006.01)
- *G06T 19/20* (2011.01)
- *G06T 7/70* (2017.01)
- *G06T 7/13* (2017.01)
- *G06T 7/90* (2017.01)
- *B29C 64/386* (2017.01)

(52) U.S. Cl.
CPC .......... *B33Y 50/02* (2014.12); *G05B 19/4099* (2013.01); *G06T 7/13* (2017.01); *G06T 7/60* (2013.01); *G06T 7/70* (2017.01); *G06T 7/90* (2017.01); *G06T 9/001* (2013.01); *G06T 9/40* (2013.01); *G06T 17/10* (2013.01); *G06T 19/20* (2013.01); *H04N 19/426* (2014.11); *G05B 2219/35134* (2013.01); *G05B 2219/49007* (2013.01)

(56) References Cited

U.S. PATENT DOCUMENTS

| | | | | |
|---|---|---|---|---|
| 8,558,834 | B2* | 10/2013 | Lee | G06T 9/40 345/424 |
| 2002/0004713 | A1* | 1/2002 | Wakabayashi | G06T 17/20 703/2 |
| 2007/0057938 | A1* | 3/2007 | Usami | G06F 17/5018 345/419 |
| 2011/0222081 | A1* | 9/2011 | Yi | G06T 17/00 358/1.9 |
| 2011/0261049 | A1* | 10/2011 | Cardno | G06Q 10/10 345/419 |
| 2011/0316855 | A1* | 12/2011 | Mejdrich | G06T 15/06 345/420 |

OTHER PUBLICATIONS

European Search Report with regard to EP 14165278 dated Mar. 24, 2015.
Partial European Search Report with regard to EP 14165278 dated Mar. 12, 2015.
Anonymous, "Culling Techniques for rendering lots of cubes", Stack Overflow, Oct. 2010, pp. 1-4, Retrieved from the Internet: URL: http://stackoverflow.com/questions/3693407/culling-techniques-for-rendering-lots-of-cubes on Jul. 21, 2015.
Baerentzen, "Octree-based Volume Sculpting", IEEE Visualization, Late Breaking Hot Topics Proceedings, Jan. 1998, pp. 9-12.
Wyvill et al., "A functional model for constructive solid geometry", The Visual Computer, Jul. 1985, vol. 1, No. 1 pp. 3-14.
Westermann et al, "Real-Time Exploration or Regular Volume Data by Adaptive Reconstruction of Isosurfaces", Visual Computer, 1999, vol. 15, No. 2, pp. 100-111.
Wang et al., "Volume Sculpting", Proceedings of the Symposium on Interactive 3D Graphics, Monterey, Apr. 1995, pp. 151-156.
Sourin, "Functionally Based Virtual Computer Art", Proceedings of the 2001 Symposium on Interactive 3D Graphics, Research Triangle Park, Mar. 2001, pp. 77-84.
Perry et al., "KIZAMU: A System for Sculpting Digital Characters", Computer Graphics, SIGGRAPH 2001, Aug. 2001, pp. 47-56.
Lam et al., "Octree Reinforced Thin Shell Objects Rapid Prototyping by Fused Deposition Modelling", International Journal of Advanced Manufacturing Technology, vol. 1, No. 9, Sep. 1998, pp. 631-636.

* cited by examiner

Legend of Octree :

« Full » leaf

« Empty » leaf

Node with 8 sons

Model:

Initial cube

Octree :

Encoding (hexa decimal):

```
00
(null byte)
```

302
floating vertex 304
shared vertex

THREE DIMENSIONAL MODELING

TECHNICAL FILED

The present subject matter relates, in general, to three dimensional computer graphics modeling and, in particular, to generation of three dimensional models suitable for three dimensional printing.

BACKGROUND

Three dimensional (3D) modeling generally refers to creation of 3D representations of objects using computer graphics. 3D models may be used in various fields, for example, in industrial design for simulation of medical devices, engineering tools, and construction elements, in software games for providing a virtual real-life experience, in education for providing hands-on training through simulation, and more recently in manufacturing objects by 3D printing. 3D printing is a process of making a 3D object from a digital 3D model by printing or laying down successive layers of material in different shapes to create the 3D object. Generally, the software applications that are available for creation and rendering of 3D models are computationally intensive and are suitable for use by expert users skilled in computer graphics.

SUMMARY

This summary is provided to introduce concepts related to 3D modeling. This summary is not intended to identify essential features of the claimed subject matter nor is it intended for use in determining or limiting the scope of the claimed subject matter.

In one implementation, a method of creating a 3 Dimensional (3D) model of an object suitable for 3D printing is described. The method includes defining an initial cuboid of edge lengths Lx, Ly, Lz for creating the 3D model. The initial cuboid implicitly defines inner cuboids from the initial cuboid so that each inner cuboid is recursively and endlessly split into 8 identical inner cuboids, each of the inner cuboids corresponding to the nodes of an infinite octree and the initial cuboid corresponding to the root node of the octree. User inputs can be received iteratively for modification of at least one inner cuboid, until the 3D model is created. In one implementation, the user input may specify a size of an inner cuboid to be modified and a selection of a point on the screen. Based on the received user input, at least one inner cuboid which is to be modified is identified. The identification is based on the size of the inner cuboid and x, y, z coordinates of the point on the screen, which were received through user input. The inner cuboid to be modified is related to the inner cuboid that is rendered at the selected point on the screen. Therefore multiple adjacent points on the screen may identify the same inner cuboid to be modified, making it not so sensible to the human imprecision of the user input. Once the inner cube to be modified is identified, the inner cube may be modified by marking the at least one inner cuboid as filled or empty.

Further, the 3D model can be represented as a compressed octree that is altered for each input from the user to incorporate the modification in the octree. Each leaf of the compressed octree can correspond to an inner cuboid or node, which is either fully filled or empty. The compressed octree can be altered by, for example, replacing a node by a full leaf when all child nodes of the node correspond to full inner cuboids. In another example, a node of the octree may be replaced by an empty leaf when all child nodes of the node correspond to empty inner cuboids. In yet another example, a full leaf may be replaced by a node with eight child nodes when at least one of the eight corresponding inner cuboids is modified as not full. Further, an empty leaf may be replaced by a node with eight child nodes when at least one of the eight corresponding cuboids is modified as not empty.

In one implementation, a binary file may be generated for the 3D model of an object suitable for 3D printing, so that any prefix of this binary file defines an approximation of the model with a computable approximation level. The method can include receiving a data structure including a compressed octree representing the 3D model, the compressed octree including a root node, child nodes, full leaves, and empty leaves. Each full leaf corresponds to a node having all full child nodes and each empty leaf corresponds to a node having all empty child nodes. The compressed octree can be traversed from the root node or depth 1, then all the nodes and leaves of depth 2, and so on until nodes and leaves of depth n where n is the depth of the octree. The traversing of all the nodes and leaves of a specific depth (D) can be done in an order that is inferred from the traversing of all the nodes and leaves of the previous depth (D−1). Further, for each node of the compressed octree, when the node is a full leaf, the node can be encoded as a null byte; when the node is an empty leaf, the node can be skipped; and when the node has child nodes, the node can be encoded with one byte, i.e., eight bits, such that each of the 8 bits correspond to one child node. Further, for each child node it can be determined whether the child node is an empty leaf or not. Thus each child node can be accordingly encoded.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
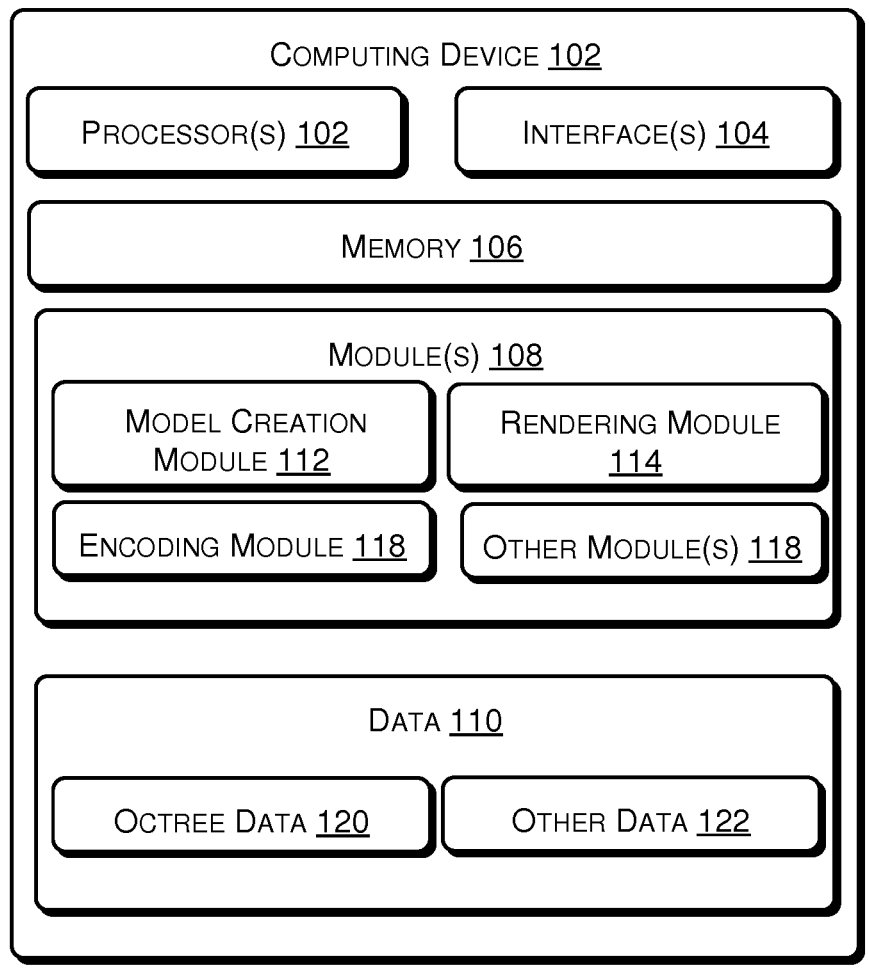
FIG. 1 illustrates a computing system for 3D modeling, according to an implementation of the present subject matter.

The present subject matter relates to systems and methods for 3D modeling, in particular for creating models for 3D printing.

Conventional professional three dimensional (3D) modeling tools are generally mesh based or curve based. Meshes are a set of polygons, most often simple triangles, which define the surface of the 3D object to be modeled. In order to describe curved objects, the curve may be approximated with smaller triangles. In other tools, mathematical equations of shapes, such as spheres, polyhedra, and b-splines may be used to generate the 3D models. Such modeling tools are generally designed to be used by experts. The users need high levels of mathematical skills and knowledge of computer graphics to use such tools. Moreover, while such tools can be used for modeling 3D surface patterns effectively, it is generally complicated to use such tools for solid models and modeling internal details, such as grooves or cavities.

In other conventional techniques, certain modeling tools divide the 3D modeling space into cubes or voxels, all of them having exactly the same size. The 3D model is then represented as a 3D matrix in which each element is a cube. The corresponding value in the matrix defines whether the cube is full or empty, thus forming the 3D model. While such techniques can be used for creating 3D images at low resolution, however, the number of cubes or data points to be handled increases rapidly as the resolution of the 3D model is increased. For example, to model a small object of a basic shape, such as up to 10 cm in length, breadth, and height, for a resolution of $\frac{1}{10}$ mm, each voxel will have to be a cube of $\frac{1}{10}$ mm length in each dimension. The matrix will as a result contain one billion data points. It then becomes impracticable for a user to create a shape using such a large number of data points. Moreover, it is also highly computationally intensive to manipulate and display billions of cubes in real time. Thus, such tools are generally not suitable for creating high resolution 3D models, for example, for 3D printing of objects.

The present subject matter provides systems and methods for 3D modeling with reduced computational intensity. Moreover, the systems and methods are easy to use with minimal user expertise. In particular, the systems and methods use a compressed octree representation for creating, manipulating, and rendering 3D models. Further, the compressed octree can be easily encoded as a binary file that is suitable for archival, transmission over a computer network, and 3D printing.

An octree is a hierarchical tree structure made up of nodes starting from a root node, where each node can have a maximum of eight child nodes. In one implementation, the root node of the octree can define an initial cuboid that corresponds to a 3D space containing the parts of the 3D object in entirety. In one example, the initial cuboid may have equal lengths in x, y, and z dimensions, thus representing a cube. In another example, the lengths in one or more dimensions may be different. Further, if the initial cuboid contains N constituents or parts, it is can be split into eight smaller cuboids or inner cuboids by cutting the length in each dimension in half so that the parts are spread into these smaller cuboids. Correspondingly, the root node can be represented as being connected to eight child nodes, each child node corresponding to a smaller cuboid. This process can be carried on iteratively, with each smaller cuboid being further split into eight smaller cuboids until each cuboid contains one part. The root node forms the first level or depth of the octree, the child nodes of the root node form the second level, and so on. Such an octree can be built in N·log N steps and can be used to enumerate the parts in log N steps.

In one implementation, to create a 3D model, an initial cuboid may be presented to a user through a graphical user interface (GUI). The user can then select to modify the initial cuboid by removing one or more inner cuboids. Further, once an inner cuboid is removed, it can also be added later by the user. Adding or removing an inner cuboid refers to marking the inner cuboid as full or empty. The inner cuboids that are added or removed by the user are not random cuboids, but correspond to nodes of the octree having the initial node as the root node. For example, if the cuboid corresponds to a cube having side length L, the user can select a size, which is $1/(2)^n$ of L, where n is an integer greater than or equal to 1. Then, by clicking a point in the initial cuboid, the user can designate one cuboid of the selected size that includes the point. Such a cuboid corresponds to a node at depth n+1 in the octree. The selected cuboid can be removed and the octree can be modified to designate the corresponding node as empty. Further, to add an inner cuboid, the user can select an add operation from a list of operations provided on the GUI. The user can then similarly select a point and a size of the cuboid containing the point to be added. Accordingly, the selected cuboid can be added and the octree can be modified to designate the corresponding node as full. Thus by constraining the selected area to be a cuboid corresponding to a node of an octree, a user can select a cuboid by a single click on the GUI, thereby making it easy to use with little skill.

Further, at any step of the modeling, the model created at that time can be represented as an octree, in which leaves are either full or empty. The octree of the initial cuboid can be a single node, i.e., the root node, which is a full leaf. In one example, the maximum depth N of the octree can be set. For example, if the cuboid corresponds to a cube having side length L, the sides of the inner cubes can be of lengths L/2, L/4, . . . $L/2^{(N-1)}$. Considering an example of 3D printing, $L/2^{(N-1)}$ may be in the range of the resolution of the 3D printer to be used. For example, $L/2^{(N-1)}$ may be just smaller than or equal to the resolution of the 3D printer.

Further, to optimize on the memory usage, the octree may be compressed by replacing an empty node by an empty leaf and a full node by a full leaf. An empty node can be understood as a node that has eight child nodes which all are empty leaves. Similarly, a full node can be understood as node that has eight child nodes which all are full leaves. Thus, the creation of the 3D model and its storage and alteration can be done with reduced computational requirements as compared to conventional techniques. Further, for any given model based on the compressed octree, there can be only one compressed octree that represents this model. However a model can be reached through several ways, for example, by removing or adding inner cuboids in different orders and iterations.

In one implementation, a binary file suitable for 3D printing may be generated for the 3D model of an object, so that any prefix of this binary file defines an approximation of the model with a computable approximation level. For the encoding and generation of the binary file, the compressed octree can be traversed from the root node or depth 1, then all the nodes and leaves of depth 2, and so on until nodes and leaves of depth n where n is the depth of the octree. The traversing of all the nodes and leaves of a specific depth (D) can be done in an order that is inferred from the traversing of all the nodes and leaves of the previous depth (D−1). Further, for each node of the compressed octree, when the node is a full leaf, the node can be encoded as a null byte; when the node is an empty leaf, the node can be skipped; and when the node has child nodes, the node can be encoded with one byte, i.e., eight bits, such that each of the 8 bits correspond to one child node. Further, for each child node it can be determined whether the child node is an empty leaf or not. Thus each child node can be accordingly encoded. Such an encoding also allows for progressive rendering of the model.

These and other aspects of the systems and methods are described in detail with reference to the FIGS. 1, 2, and 3. The systems and the methods described herein may be implemented in a variety of computing environments employing a computing device. It should be noted that the description and figures merely illustrate the principles of the present subject matter. It is thus understood that various arrangements can be devised that, although not explicitly described or shown herein, embody the principles of the present subject matter. Moreover, all statements herein reciting principles, aspects, and embodiments of the present subject matter, as well as specific examples thereof, are intended to encompass equivalents thereof.

FIG. 1 schematically illustrates a computing device 100 for 3D modeling, according to an implementation of the present subject matter.

The computing device 100 can be any device, such as a desktop, laptop, a mobile device, and the like, which is capable of receiving user inputs through a graphical user interface and processing the user inputs to create a 3D model. In one implementation, the computing device 100 includes processor(s) 102. The processor(s) 102 may be implemented as microprocessors, microcomputers, microcontrollers, digital signal processors, central processing units, state machines, logic circuitries, and/or any devices that manipulate signals based on operational instructions. Among other capabilities, the processor(s) 102 fetch and execute computer-readable instructions stored in the memory. The functions of the various elements shown in the figure, including any functional blocks labeled as "processor (s)", may be provided through the use of dedicated hardware as well as hardware capable of executing machine readable instructions.

The computing device 100 also includes interface(s) 104. The interface(s) 104 may include a variety of machine readable instructions-based interfaces and hardware interfaces that allow the computing device 100 to interact with input/output devices, such as a mouse or a keyboard, peripheral devices, such as a memory stick or a 3D printer, or network connected devices, such a 3D printer or another computing device or external repositories connected over a network.

Further, the computing device 100 can include memory 106 coupled to the processor(s) 102. The memory 106 may include any computer-readable medium including, for example, volatile memory (e.g., RAM), and/or non-volatile memory (e.g., EPROM, flash memory, etc.).

Further, computing device 100 can includes module(s) 108 and data 110. The module(s) 108 may be coupled to the processor(s) 102. The module(s) 108, amongst other things, include routines, programs, objects, components, data structures, and the like, which perform particular tasks or implement particular abstract data types. The module(s) 108 further include modules that supplement applications on the computing device 100, for example, modules of an operating system. The data 110 serves, amongst other things, as a repository for storing data that may be fetched, processed, received, or generated by the module(s) 108. Although the data 110 is shown internal to the computing device 100, it may be understood that the data 110 can reside in an external repository (not shown in the figure), which may be coupled to the computing device 100.

In an implementation, the module(s) 108 of the computing device 100 includes a model creation module 112, a rendering module 114, an encoding module 116, and other module(s) 118. In an implementation, the data 110 of the computing device 100 includes compressed octree data 120 and other data 122. The other module(s) 118 may include programs or coded instructions that supplement applications and functions, for example, programs in the operating system of the computing device 100, and the other data 122 comprise data for the functioning of one or more or the module(s) 108.

In an implementation, the model creation module 112 can provide a graphical user interface (GUI) with various tools and options for allowing the user to create a 3D model. Further, the model creation module 112 can employ an octree structure for representing the 3D model at any point in time as the user creates and modifies the 3D model, as is described with reference to FIG. 2a-2d in conjunction with FIG. 1.

Figure 2A:
FIGS. 2a-2d illustrate octree representations as a 3D model is created, according to an implementation of the present subject matter.
Figure 2A:
Figure 2A:

As shown in FIG. 2a, a compressed octree may have three types of entities: a full leaf, i.e., a node corresponding to a full cuboid, an empty leaf, i.e., a node corresponding to an empty cuboid, and a node having eight child nodes, some of the child nodes being empty and some of which are full. As used herein, the term "full" denotes a cuboid that is complete and so the space is full. The term "empty" denotes a cuboid that is not present and so the space is empty.

Figure 2B:
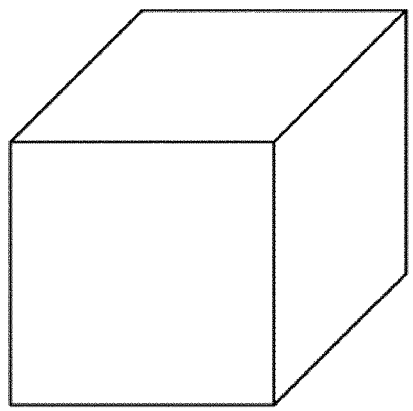
Figure 2B:

To create a 3D model, the model creation module 112 may present an initial cuboid to a user through a graphical user interface (GUI). As shown in FIG. 2b, the initial cuboid may correspond to a full leaf since the initial cuboid represents a full 3D space in which the 3D model will be created.

The GUI presented by the model creation module 112 can include, for example, tool bars for selecting various operations to be performed by the user, such as adding an inner cuboid, deleting an inner cuboid, modifying a row of inner cuboids, pushing or pulling inner cuboids, and rotating the 3D model or the inner cuboid, menu options for selecting a size of an inner cuboid to be modified, and the like. The user can thus easily select the operation to be performed and the size of the cuboid on which the operation is to be performed through the GUI.

Figure 2C:
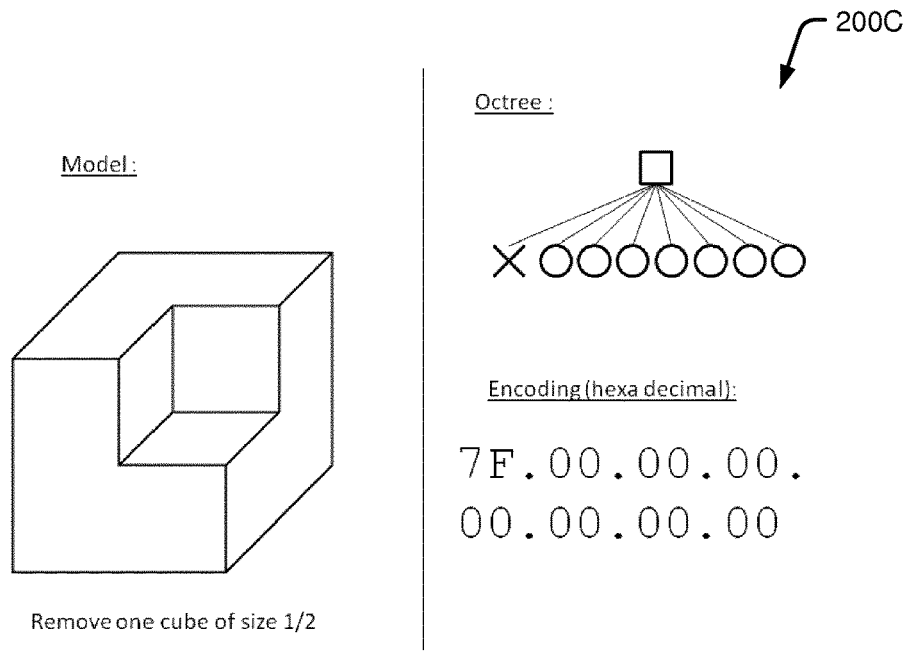

In one example, the user can remove one or more inner cuboids from the initial cuboid. The inner cuboids that are removed by the user are not random cuboids, but correspond to nodes of the octree having the initial node as the root node. For example, if the initial cuboid corresponds to a cube having side length L, the user can select a size, which is $1/(2)^n$ of L, where n is an integer greater than or equal to 1. Then, by clicking a point in the initial cuboid, the user can designate one cuboid of the selected size that includes the point. The selected cuboid can be removed and the octree can be modified to designate the corresponding node as empty. For example, as shown in FIG. 2c, a user may select to remove a cuboid of size L/2, i.e., at depth 2 of the octree. Accordingly, the full leaf corresponding to the initial cuboid will be replaced by a node with eight child nodes since the initial cuboid is no longer full. Further, the empty child node corresponding to the cuboid that has been removed will be replaced by an empty leaf and the other child nodes that are still full will be replaced by full leaves.

In case the inner cuboid is at a greater depth, for example, at depth 4 corresponding to L/8, then the model creation module 112 will replace the node comprising the selected cuboid with child nodes iteratively till the selected inner cuboid is reached. For example, child node at depth 2, corresponding to L/2, and its child node at depth 3, corresponding to L/4, which contain the selected inner cuboid at depth 4 will be replaced by nodes with eight child nodes.

Further, as mentioned above, the child node corresponding to the selected inner cuboid will be replaced by an empty leaf and the full child nodes at depth 2, depth 3, and depth 4 will be replaced by full leaves.

In one example, the user can select a shape of a volume from which cuboids are to be removed. For example, in order to remove a parallelepiped area P which is not a cuboid of the octree, the model creation module 112 can recursively divide the parallelepiped area P into cuboids of the octree, and remove them.

Figure 2D:
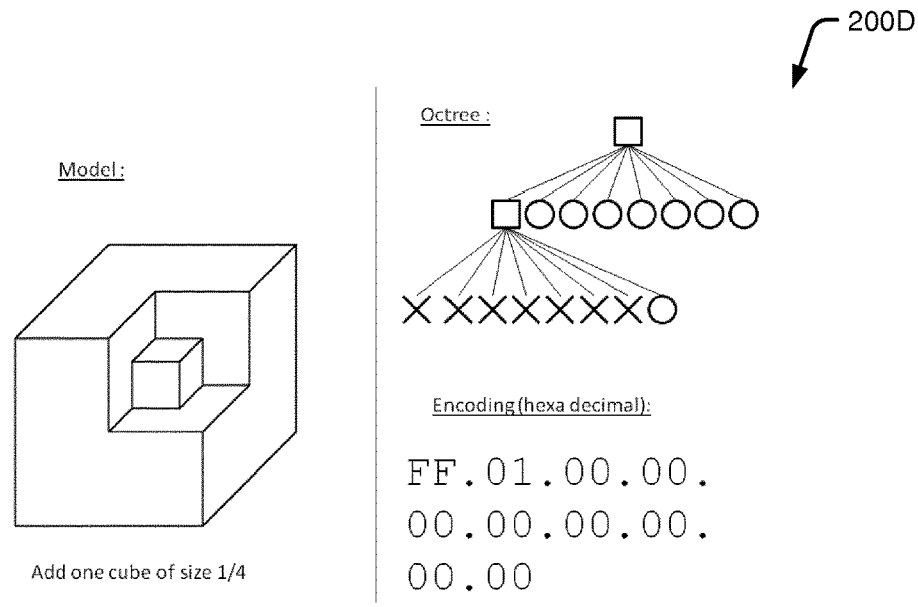

In another example, to add an inner cuboid, the user can select an add operation from a list of operations provided on the GUI. The user can then select a point and a size of the cuboid containing the point to be added and accordingly the 3D model and the compressed octree can be modified. For example, as shown in FIG. 2d, if an inner cuboid is added to a space that was previously empty, the empty leaf will be replaced by a node with eight child nodes. The full child node corresponding to the inner cuboid that has been added will be replaced by a full leaf and the other child nodes that are still empty will be replaced by empty leaves. This can also be done at any depth by iteratively adding child nodes till the selected inner cuboid is reached. In this case, the child node corresponding to the selected inner cuboid will be replaced by a full leaf and the empty child nodes at that depth and lower depths will be replaced by empty leaves. Further, the model creation module 112 can also provide tools for adding cuboids corresponding to a particular shape of a volume as discussed above for removal of inner cuboids.

In one example, the model creation module 112 can provide an option to the user to add colors to the 3D model, for example, through a GUI toolbar. In such a case, each leaf of the compressed octree can correspond to an inner cuboid that is either fully filled with a particular color or fully empty. Further, the user can specify modifications to mark one or more inner cuboids as filled with a particular color. Accordingly, the model creation module 112 can alter the compressed octree by replacing a node by a full leaf of a particular color when all the child nodes of the node correspond to filled inner cuboids of the particular color. In another example, a full leaf of the particular color can be replaced by a node with eight child nodes when at least one of the eight child nodes of the full leaf corresponds to an inner cuboid that is marked as empty or as filled with a different color.

Thus by a single click on the screen, the user can select and modify inner cuboids of a selected size making it easy to use with minimal expertise. In one implementation, to identify the cuboid selected by the user for addition or removal, the model creation module 112 can define a 3D ray from a camera outside the initial cuboid toward the point clicked on the screen. If the depth of the octree is n, then there can be $2^n-1$ planes on each direction x, y and z from a point that is clicked. For each direction the model creation module 112 can examine each of these $2^n-1$ planes, starting from the closest. Let consider (ux, uy, uz) as the vector of the 3D ray. If ux is positive, then for the direction x, the model creation module 112 will consider first the plane with the minimal x, and iterate until the plane with the maximal x.

For each plane, the model creation module 112 computes the intersection I between the ray and the plane, which gives a pixel coordinate. Then it looks in the octree for this coordinate. If this coordinate is on the edge of an inner cuboid marked as full, it returns this inner cuboid as a candidate inner cuboid. Then it stops iterating on this direction. After this computation is done on the three directions to identify three candidate inner cuboids, the model creation module 112 identifies the nearest candidate inner cuboid as that candidate inner cuboid that has least distance between the corresponding intersection and the origin amongst the three candidate inner cuboids. The model creation module 112 then, to identify the inner cuboid of selected size which was clicked by the user, identifies the inner cuboid of selected size which contains the nearest candidate inner cuboid or is contained by the nearest candidate inner cuboid.

In one implementation, the model creation module 112 can allow a user to clip a part of the 3D model and can independently render the clipped part. The previous techniques can be applied to a subset of the octree. For example, the user can select a volume of inner cuboids from the initial cuboid wherein the volume is a cuboid made of inner cuboids of the same size. For example, if the cuboid corresponds to a cube having side length L, the user can select a size, which is $1/(2)^n$ of L. Then the GUI lets the user select a cuboid volume whose coordinates ($x_{min}$, $x_{max}$, $y_{min}$, $y_{max}$, $z_{min}$, $z_{max}$) are all multiples of $1/(2)_n$ of L. This cuboid volume is then the clipped volume.

The model creation module 112 can handle the clipped volume independently of the rest of the 3D model. For example, the tool can render independently the clipped volume while the part of the 3D model which is outside the clipped volume may not be rendered or may be rendered as a wire mesh or in any other form. For this, the model creation module 112 can create an independent compressed octree corresponding to the clipped volume and can allow the user to modify one or more inner cuboids within the clipped volume in the same manner as in the initial cuboid. This allows a user to work with details that are not accessible easily on the whole model, or that are inside the 3D model, for example a hollow region in the 3D model. In one implementation, when the clipped volume is rendered independent of the initial cuboid, the model creation module 112 can display the size of the clipped volume and can allow the user to measure parts in the clipped volume. Thus, the user can define details to a scale within the clipped volume.

Further, the model creation module 112 allows a user to move, copy or export the clipped volume independent of the 3D model. For example, the user can push or pull a clipped volume or clipped part of a 3D model for a particular distance within the space of the initial cuboid. In order to move the clipped part, the user can select the action, push or pull, a part of the 3D model, and a direction in which the part of the 3D model is to be pushed or pulled. For example, if the cuboid corresponds to a cube having side length L, the user can select a distance, which is $1/(2)^P$ of L. To move the part by a distance of $L/2^P$, the model creation module 112 can create a new model from scratch. It can iterate on all full leaves of the current model. If this leaf is outside the clipping area, it is copied on the new model. If this leaf is inside the clipping area, it is translated from $L/2^P$, clipped by the clipping area, and added on the new model. If this leaf is crossing the clipping area, it is recursively divided by 8 smaller cubes and the algorithm is called recursively.

Further, in one implementation, the model creation module 112 can allow a texture to be projected onto the 3D model being created. For example, this texture represents the shape of the 3D model the user would like to obtain. The texture can be visible to the user even as the 3D model is being built. Thus, the user can easily identify the inner cuboids to be modified and can provide inputs to the model creation module 112 accordingly.

In one implementation, as the 3D model is created, the compressed octree corresponding to the 3D model may be saved, for example, in the octree data 120 for further use. As can be gathered, the present systems and methods provide for creation of a compressed octree for a given 3D model such that there is only one compressed octree that represents the given 3D model. However the model and the compressed octree can be reached through several ways as the users can modify cuboids in different orders and rework some parts of the model several times. Since the various iterations may not be stored by themselves, the 3D model can be stored in an optimized way with less data storage requirements. Further, the user can easily open an existing 3D model and work on it.

In one implementation, the rendering module 114 may render a stored 3D model by traversing its compressed octree structure saved in the octree data 120. For optimized rendering, the rendering module 114 may render only those sides of inner cuboids that are visible, i.e., which form an outer boundary and do not overlap with a side of an adjacent inner cuboid. For this, in one implementation, the rendering module 114 may, for each side S of each full leaf, identify an adjacent cuboid of the side S in the compressed octree and determine whether the adjacent cuboid corresponds to a leaf. Further the rendering module 114 may render the side S based on the determining. For example, when the adjacent cuboid corresponds to a leaf, the rendering module 114 may render the side S when the adjacent leaf is empty and not render the side S when the adjacent leaf is full. In another example, when the adjacent cuboid does not correspond to a leaf, the rendering module may recursively split the side S into four equal rectangles to obtain split sides S'. Further, for each split side S', the steps performed for the side S may be repeated. Thus, the 3D model can be rendered efficiently.

In one implementation, the encoding module 118 can encode the compressed octree structure stored in the octree data 120 to generate a binary file corresponding to the 3D model. The binary file may be generated for the 3D model of an object so that it is suitable for 3D printing and any prefix of this binary file defines an approximation of the model with a computable approximation level. For the encoding, the compressed octree can be traversed from the root node or depth 1, then all the nodes and leaves of depth 2, and so on until nodes and leaves of depth n where n is the depth of the octree. The traversing of all the nodes and leaves of a specific depth (D) can be done in an order that is inferred from the traversing of all the nodes and leaves of the previous depth (D−1). Further, for each node of the compressed octree, when the node is a full leaf, the node can be encoded as a null byte; when the node is an empty leaf, the node can be skipped; and when the node has child nodes, the node can be encoded with one byte, i.e., eight bits, such that each of the 8 bits correspond to one child node. Further, for each child node it can be determined whether the child node is an empty leaf or not. Thus each child node can be accordingly encoded.

For example, as shown in FIG. 2b, the initial cuboid corresponds to a cube having side length L. The initial cuboid is one single full leaf and hence can be encoded as 00. Further, as shown in FIG. 2c, if an inner cuboid of size L/2 is removed, the empty inner cuboid is encoded by bit 0, and thus the corresponding code is 7F.00.00.00.00.00.00.00. In this case, the first byte for the root node is 7F in hexadecimal, which is 11111110 in binary corresponding to seven child nodes which are not empty leaves, and one child node which is an empty leaf. Then there are 7 null bytes after the first byte because the seven child nodes are full leaves.

Similarly, as shown in FIG. 2d, if an inner cuboid of size L/4 is added to the empty inner cuboid of size L/2, the corresponding code is FF.01.00.00.00.00.00.00.00.00. The first byte for the root node is FF that denotes that all eight child nodes are not empty leaves. The 01 in the second byte denotes that, of the first child node of the root node, one child node C is not empty. Then there are 7 null bytes to denote that the other seven child nodes of the root node are full leaves. Then there is 1 null byte to denote that child node C is full leaf.

Thus, the bitstream encodes first the root node, then all of its not empty sons, then all of its not empty grand-sons, and so on, with increasing level of depth. When decoding this bitstream, if the rendering module 114 stops in a middle of a level of depth d, the rendering module 114 will have decoded an incomplete tree where all leafs are either empty, full, or subdivided. Subdivided leaves are all on the levels d or d−1. In such a case, the rendering module 114 can replace these subdivided leaves by full leaves to get a model which is an approximation of the encoded model of approximation size at least $L/2d^{d-1}$.

Such an encoding also allows for progressive transmission and rendering of the model. For example, the encoded model can be a bitstream that could be stored on a file, or sent onto a network. If a computing device receives only the beginning of the bitstream, it will be able to render an approximation of the 3D model. This can be used, for example, if the bitstream is long to transmit, or if the computing device has less resources available for rendering and cannot handle detailed 3D models. In such a case, the beginning of the received file allows the computing device to display a fuzzy preview with fewer details, and if more information is received, the amount of details rendered increases.

In one example, the encoding module 118 can also create a file for exporting into STL format, which is commonly used by 3D printers for printing. An STL file is a list of polygons, which vertices are provided in a specific order so that it defines which side of the polygon is empty and which side is full. Some printer drivers require that these polygons meet some requirements, for example, the polygons must be part of the border of the model, no polygon should be inside the material of the model, and the polygons must describe the complete border of the model. Further, certain printer drivers require that there be no floating vertex.

Figure 3:
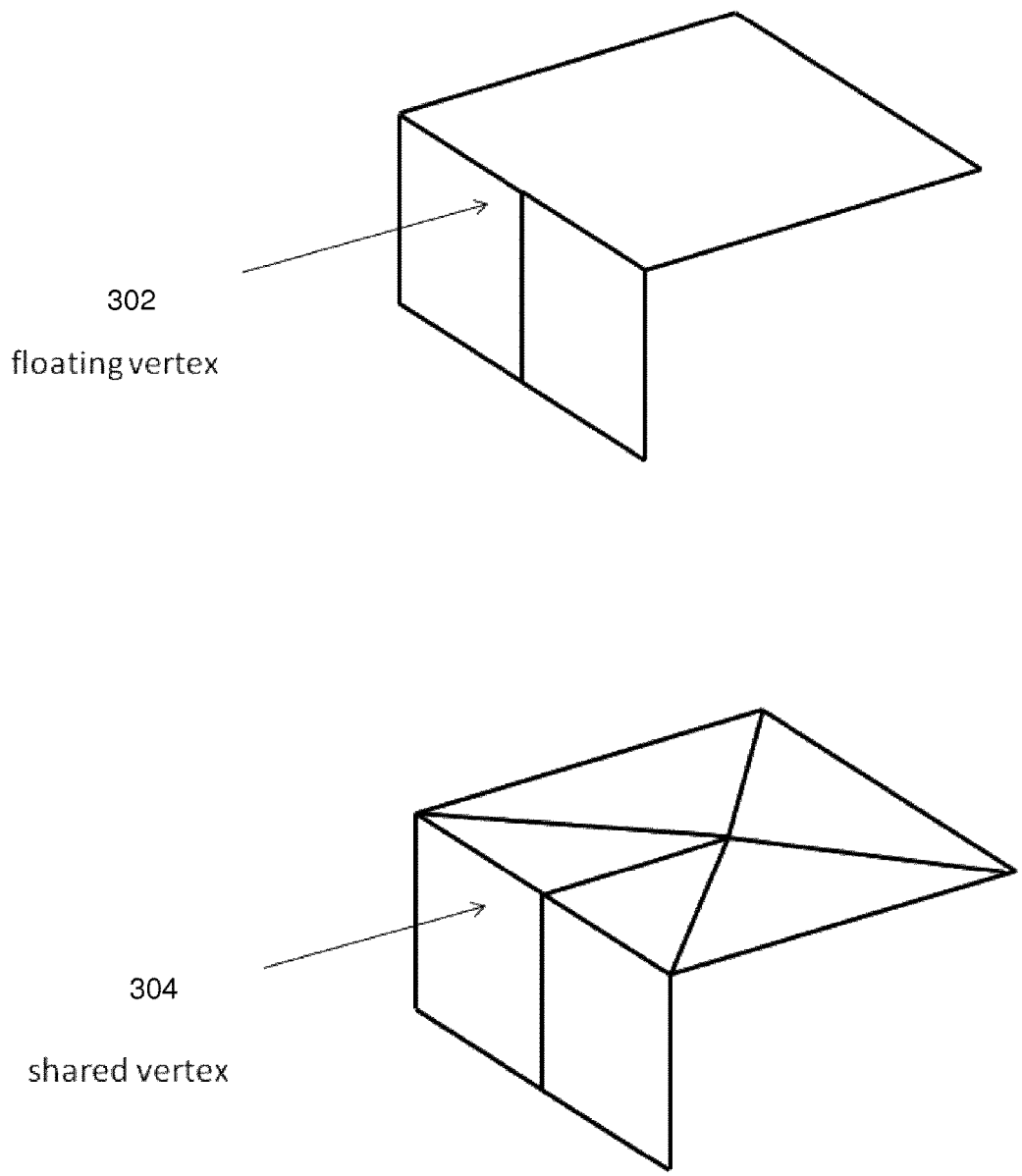
FIG. 3 illustrates a schematic of floating vertex and shared vertex, according to an implementation of the present subject matter.

With reference to FIG. 3, consider a model 302 that includes a floating vertex, i.e., a vertex that is not at any intersection of edges. In order to export the model, the encoding module 118 can detect the floating vertices, and split the polygons as shown in model 304. For this purpose, the encoding module 118 builds a vertex octree in which all the vertices are stored. Then, by traversing the vertex octree from one vertex A to a vertex B, the encoding module 118 can find all the floating vertices which are between A and B, already ordered. Further, for each side of a rendered polygon, the encoding module 118 can find the floating vertices and split the rendered polygon by adding the middle vertex of the polygon. Thus, the 3D model can be exported into a file format that is suitable for 3D printing.

The various aspects of the present subject matter discussed above provide an optimized and robust method for creating 3D models using a user friendly GUI that is not computationally intensive and thus can be used by non-expert users with less computational and data storage resources than as is conventionally required. Further, the 3D models thus generated can be encoded for progressive rendering and can be exported into 3D printer driver compliant formats easily.

Figure 4:
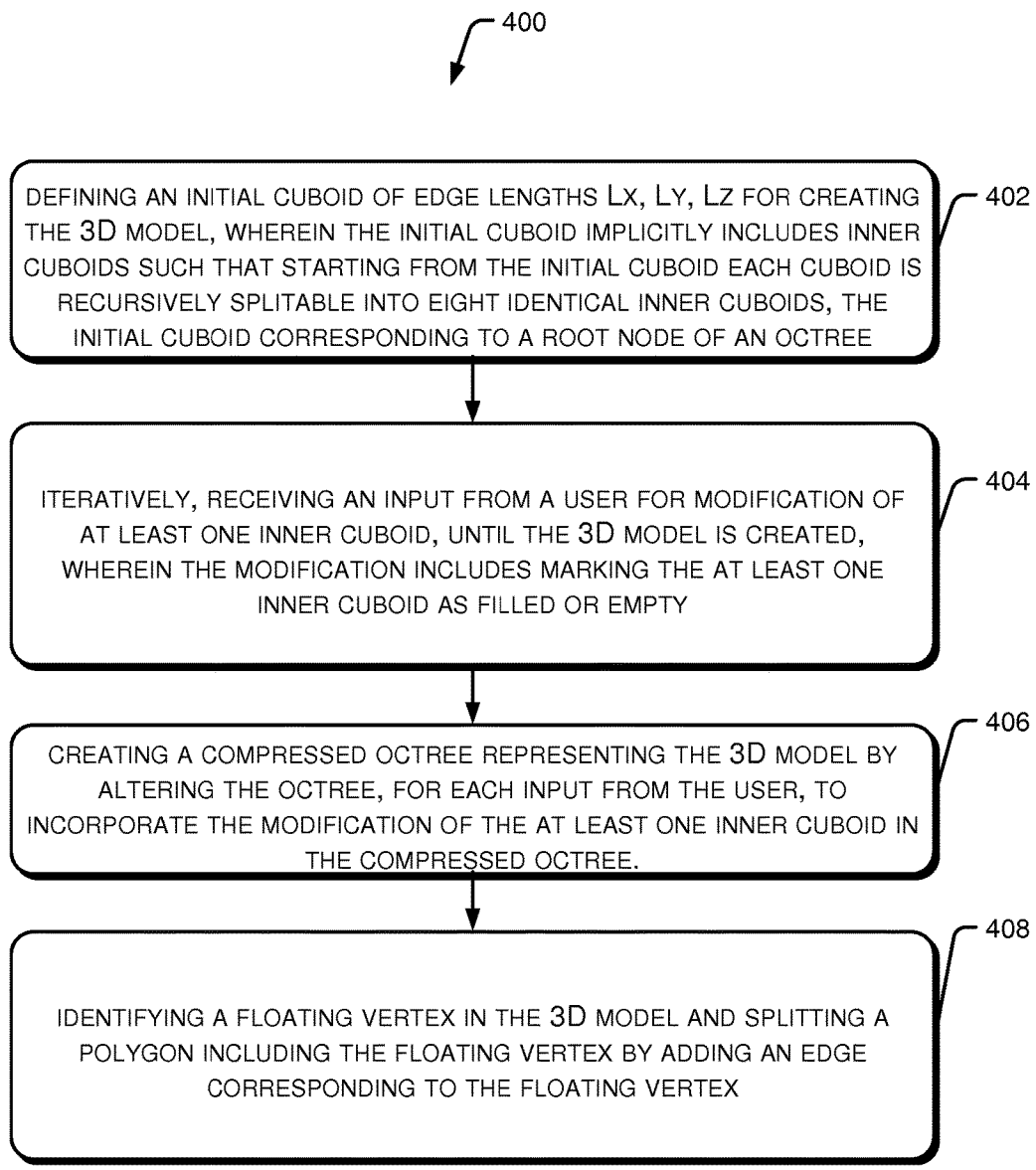
FIG. 4 illustrates a method for creating a 3D model, according to an implementation of the present subject matter.
Figure 5:
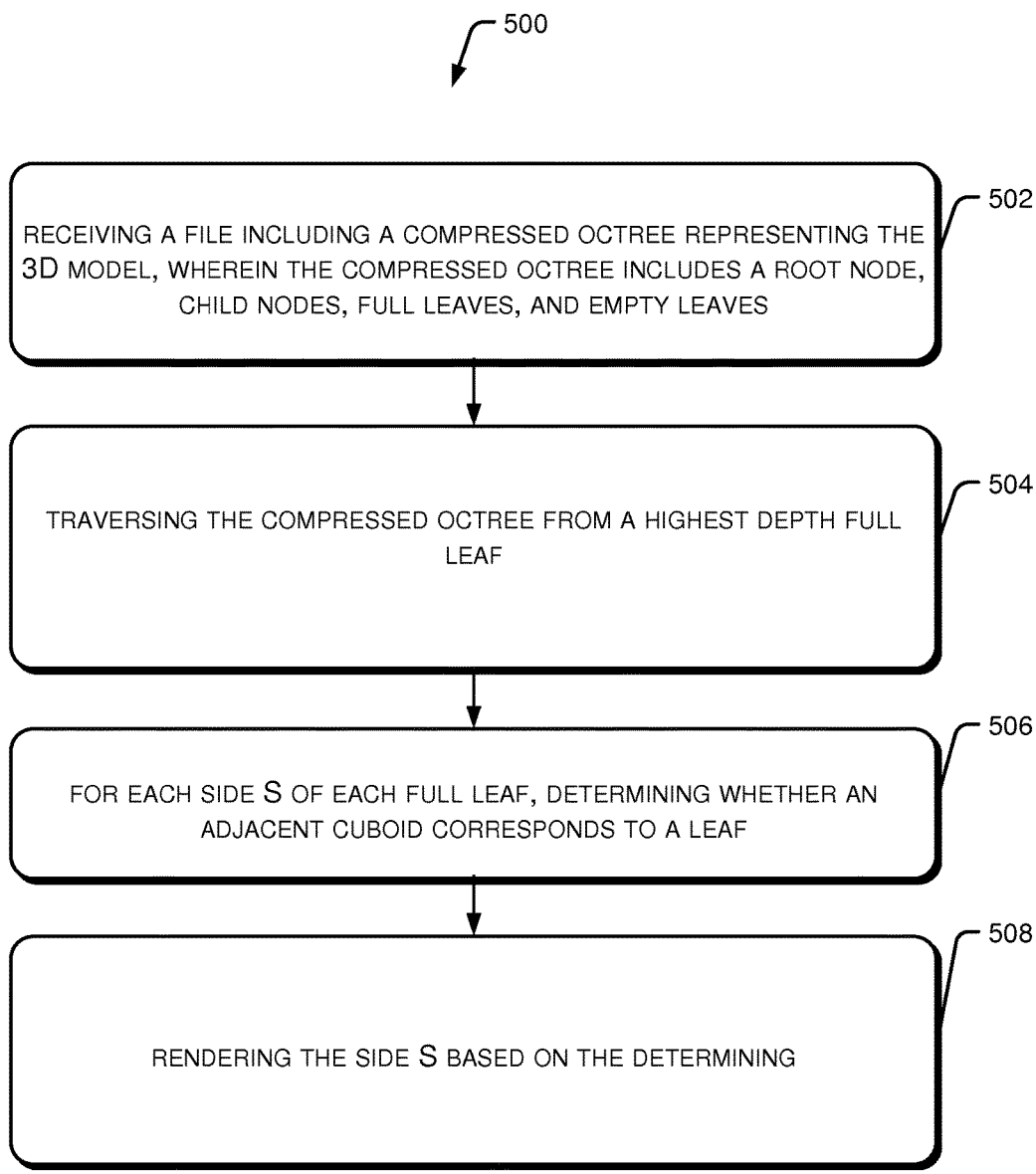
FIG. 5 illustrates a method for rendering a 3D model, according to an implementation of the present subject matter.
Figure 6:
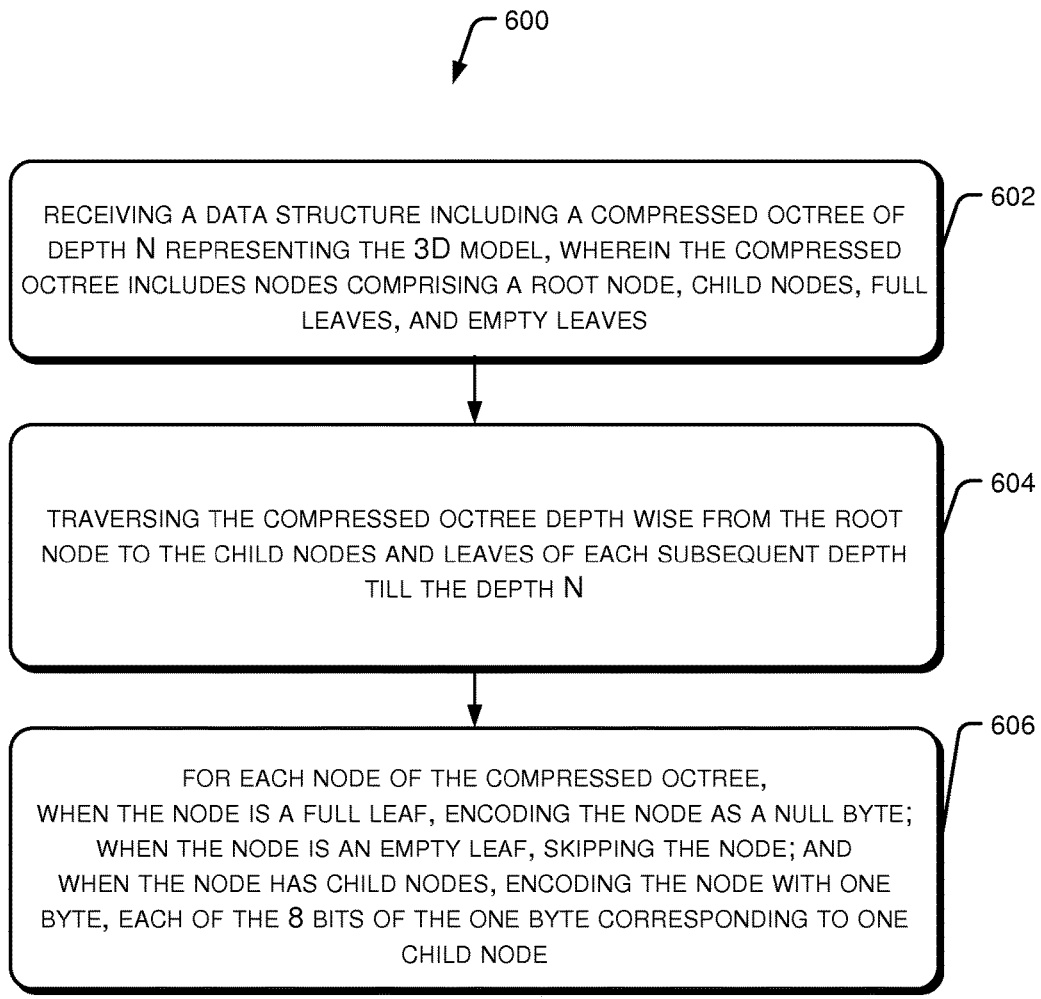
FIG. 6 illustrates a method for encoding a file corresponding to a 3D model, according to an implementation of the present subject matter.

FIGS. 4, 5, and 6 illustrate methods 400, 500, and 600 for creating, rendering and encoding 3D models, according to different examples of the present subject matter. The order in which the methods 400, 500, and 600 are described is not intended to be construed as a limitation, and some of the described method blocks can be combined in a different order to implement the methods 400, 500, and 600, or an alternative method. Additionally, individual blocks may be deleted from the methods 400, 500, and 600 without departing from the spirit and scope of the subject matter described herein. Furthermore, the methods 400, 500, and 600 may be implemented in any suitable hardware, computer-readable instructions, or combination thereof.

The steps of the methods 400, 500, and 600 may be performed by either a computing device under the instruction of machine executable instructions stored on a non-transitory computer readable medium or by dedicated hardware circuits, microcontrollers, or logic circuits. For example, the methods 400, 500, and 600 may be performed by the computing device 102. Herein, some examples are also intended to cover non-transitory computer readable medium, for example, digital data storage media, which are computer readable and encode computer-executable instructions, where said instructions perform some or all of the steps of the described methods 400, 500, and 600.

FIG. 4 illustrates a method to create a 3D model suitable for 3D printing in accordance with one example of the present subject matter. With reference to method 400, at block 402, an initial cuboid of edge lengths Lx, Ly, Lz may be defined for creating the 3D model. The initial cuboid can implicitly include inner cuboids such that starting from the initial cuboid each cuboid is recursively splitable into eight identical inner cuboids. Further, the initial cuboid corresponds to the root node of an octree and the inner cuboids correspond to child nodes or leaves of the octree.

At block 404, iteratively, inputs may received from a user for modification of at least one inner cuboid, until the 3D model is created. The modification can include marking the at least one inner cuboid as filled or empty. The user input can include a size of the at least one inner cuboid to be modified and a selection of a point in the at least one inner cuboid to be modified. Based on the size and x, y, z coordinates of the point, the at least one inner cuboid to be modified can be identified.

In one example, the identifying the at least one inner cuboid to be modified can include determining a ray from an origin outside the initial cuboid to the point. Further, considering the initial cuboid to be divided by mutually perpendicular planes forming sides of the inner cuboids of the octree, three candidate inner cuboids can be identified. For this in directions of each of the x, y, z coordinates, a nearest plane intersecting the ray at a minimal distance from the point and a farthest plane intersecting the ray at a maximal distance from the point can be ascertained. For each plane from the nearest plane to the farthest plane, an intersection between the ray and the each plane can be iteratively computed until the intersection corresponds to a point on an edge of a inner cuboid marked as full, which is then considered as a candidate inner cuboid. The nearest of the at most three candidate inner cuboids can be determined as the candidate inner cuboid which has least distance between the corresponding intersection and the origin. The inner cuboid to be modified is then the inner cuboid of the size input by the user that contains the nearest candidate inner cuboid, or is contained by the nearest candidate inner cuboid.

At block 406 a compressed octree representing the 3D model may be created by altering the octree, for each input from the user, to incorporate the modification of the at least one inner cuboid in the compressed octree.

For example, each leaf of the compressed octree may correspond to an inner cuboid that is either fully filled or fully empty. In such a case, the altering can include replacing a node by a full leaf when all the child nodes of the full node correspond to filled inner cuboids, replacing a node by an empty leaf when all the child nodes of the empty node correspond to empty inner cuboids, replacing a full leaf by a node with eight child nodes when at least one of the eight child nodes of the full leaf corresponds to an inner cuboid that is marked as empty, and replacing an empty leaf by a node with eight child nodes when at least one of the eight child nodes of the empty leaf corresponds to an inner cuboid that is marked as filled.

In another example, each leaf of the compressed octree can correspond to an inner cuboid that is either fully filled with a particular color or fully empty. In such a case, the altering can include replacing a node by a full leaf of a particular color when all the child nodes of the node correspond to filled inner cuboids of the particular color, replacing a node by an empty leaf when all the child nodes of the node correspond to empty inner cuboids, replacing a full leaf of the particular color by a node with eight child nodes when at least one of the eight child nodes of the full leaf corresponds to an inner cuboid that is marked as empty or as a different color, and replacing an empty leaf by a node with eight child nodes when at least one of the eight child nodes of the empty leaf corresponds to an inner cuboid that is marked as filled.

To assist the user in making the modifications, the user can select a volume of inner cuboids from the initial cuboid wherein the volume is a cuboid made of inner cuboids of the same size. For example, if the cuboid corresponds to a cube having side length L, the user can select a size, which is $1/(2)^n$ of L. Then the GUI lets the user select a cuboid volume whose coordinates ($x_{min}$, $x_{max}$, $y_{min}$, $y_{max}$, $z_{min}$, $z_{max}$) are all multiples of $1/(2)^n$ of L. This volume can be used as a clipping volume. The volume of inner cuboids can be then clipped from the initial cuboid for independent rendering and modification of the inner cuboids in the volume. In one example, the volume of inner cuboids may be moved according to a translation vector. The moving the volume of inner cuboids can correspond to creating a second compressed octree for the 3D model in which inner cuboids which are outside the clipping volume are copied in the same position; and inner cuboids which are inside the clipping volume are copied in their translated position inside the clipping volume.

In other examples, a texture may be projected onto the initial cuboid and the projection may be retained while the initial cuboid is modified to form the 3D model, thereby assisting the user in creating the model.

Once the 3D model and corresponding octree is created, at block 406, the 3D model can be encoded. In one example, a floating vertex can be identified in the 3D model and a polygon including the floating vertex can be split. For this, a vertex octree can be created where each leaf of the vertex octree corresponds to a vertex of the 3D model and the vertex octree can be traversed to identify the floating vertex. In another example, a binary file suitable for progressive rendering may be created.

FIG. 5 illustrates a method 500 to render a 3D model in accordance with one example of the present subject matter.

At block 502, a file including a compressed octree representing the 3D model may be received. The compressed octree can include a root node, child nodes, full leaves, and empty leaves.

At block 504, the compressed octree is traversed from a highest depth full leaf.

At block 506, for each side S of each full leaf it is determined whether an adjacent cuboid corresponds to a leaf. For this, an adjacent cuboid of the side S in the octree is identified and it is then determined whether the adjacent cuboid corresponds to a leaf.

At block 508, the side S is rendered based on the determining. For example, when the adjacent cuboid corresponds to the leaf, the side S is rendered when the leaf is empty and not rendered when the leaf is full. In another example, when the adjacent cuboid does not correspond to the leaf, the side S is recursively split into equal rectangles to obtain split sides S'. Further, for each split side S', the steps performed for the side S are repeated, thereby efficiently rendering the 3D model from the compressed octree.

FIG. 6 illustrates a method 600 to encode a binary file corresponding to a 3D model in accordance with one example of the present subject matter. The binary file thus encoded can be suitable for progressive rendering of a 3 Dimensional (3D) model of an object suitable for 3D printing.

At block 602, a data structure including a compressed octree of depth N representing the 3D model is received. The compressed octree can include nodes comprising a root node, child nodes, full leaves, and empty leaves. An empty leaf replaces an empty node having all empty child nodes.

At block 604, the compressed octree can be traversed depth wise from the root node to the child nodes and leaves of each subsequent depth till the depth N. In one example, the traversing of the nodes of a specific depth (D) is done in an order that is inferred from the traversing of the nodes of the previous depth (D−1).

At block 606, the encoding may be performed such that for each node of the compressed octree, when the node is a full leaf the node is encoded as a null byte; when the node is an empty leaf the node is skipped; and when the node has child nodes the node is encoded with one byte, each of the 8 bits of the one byte corresponding to one child node. It can be then determined whether the one child is an empty leaf or not, and the encoding steps can be repeated accordingly.

Although implementations for 3D modeling have been described in language specific to structural features and/or methods, it is to be understood that the invention is not necessarily limited to the specific features or methods described. Rather, the specific features and methods are disclosed and explained in the context of a few implementations for 3D modeling.

What is claimed is:

1. A method of creating a 3 Dimensional (3D) model of an object suitable for 3D printing, the method comprising:
    defining, by a processor, an initial cuboid of edge lengths Lx, Ly, Lz for creating the 3D model, wherein the initial cuboid implicitly comprises inner cuboids such that starting from the initial cuboid each cuboid is recursively splittable into eight identical inner cuboids, wherein the initial cuboid corresponds to the root node of an octree and the inner cuboids correspond to child nodes or leaves of the octree;
    iteratively receiving, through input from a user, a size of an inner cuboid to be modified and a selection of a point on the screen;
    identifying at least one inner cuboid to be modified based on the size of the inner cuboid and x, y, z coordinates of the point on the screen, received through user input, wherein the at least one inner cuboid to be modified is related to an inner cuboid that is rendered at the selected point on the screen;
    modifying by marking the at least one inner cuboid as filled or empty; and
    creating a compressed octree representing the 3D model by modifying the octree, for each input from the user, to incorporate the modification of the at least one inner cuboid in the compressed octree; and
    wherein:
        each leaf of the compressed octree corresponds to an inner cuboid that is either fully filled with a particular color or fully empty; and
        the modifying comprises:
            replacing a node by a full leaf of a particular color when all the child nodes of the node correspond to filled inner cuboids of the particular color;
            replacing a node by an empty leaf when all the child nodes of the node correspond to empty inner cuboids;
            replacing a full leaf of the particular color by a node with eight child nodes when at least one of the eight child nodes of the full leaf corresponds to an inner cuboid that is marked as empty or as a different color; and
            replacing an empty leaf by a node with eight child nodes when at least one of the eight child nodes of the empty leaf corresponds to an inner cuboid that is marked as filled.

2. The method according to claim 1, wherein each leaf of the compressed octree corresponds to an inner cuboid that is either fully filled or fully empty and wherein the modifying comprises:
    replacing a node by a full leaf when all the child nodes of the node correspond to filled inner cuboids;
    replacing a node by an empty leaf when all the child nodes of the node correspond to empty inner cuboids;
    replacing a full leaf by a node with eight child nodes when at least one of the eight child nodes of the full leaf corresponds to an inner cuboid that is marked as empty; and
    replacing an empty leaf by a node with eight child nodes when at least one of the eight child nodes of the empty leaf corresponds to an inner cuboid that is marked as filled.

3. The method according to claim 1, wherein the identifying the at least one inner cuboid to be modified comprises:
    determining a ray from an origin outside the initial cuboid to the point; and
    considering the initial cuboid to be divided by mutually perpendicular planes forming sides of the inner cuboids of the octree, identifying at most three candidate inner cuboids by performing, in directions of each of the x, y, z coordinates, the steps comprising:
        ascertaining a nearest plane intersecting the ray at a minimal distance from the point and a farthest plane intersecting the ray at a maximal distance from the point;
        iteratively computing, for each plane from the nearest plane to the farthest plane, an intersection between the ray and the each plane, until the intersection corresponds to a point on an edge of an inner cuboid marked as full and then considered as a candidate inner cuboid;

identifying a nearest cuboid of the at most three candidate inner cuboids, wherein the nearest cuboid of the at most three candidate inner cuboids has least distance between the corresponding intersection and the origin; and identifying the at least one inner cuboid to be modified, wherein the at least one inner cuboid to be modified is the inner cuboid of the size input by the user that contains the nearest of the at most three candidate inner cuboids.

4. The method according to claim 1, the method further comprising:

identifying a volume of inner cuboids from the initial cuboid wherein the volume is a cuboid made of inner cuboids of the same size; and clipping the volume of inner cuboids from the initial cuboid for independent rendering and modification of the inner cuboids in the volume.

5. The method according to claim 4 further comprising moving the volume of inner cuboids accordingly to a translation vector within the initial cuboid, wherein the moving the volume of inner cuboids comprises creating a second compressed octree for the 3D model in which: inner cuboids which are outside the clipping volume are copied in the same position; and inner cuboids which are inside the clipping volume are copied in their translated position inside the clipping volume.

6. The method according to claim 1, the method further comprising projecting a texture provided by the user on the initial cuboid and retaining the projection while the initial cuboid is modified to form the 3D model.

7. The method according to claim 1, the method further comprising rendering a 3 Dimensional (3D) model of an object suitable for 3D printing, wherein the rendering comprises:

receiving a file including a compressed octree representing the 3D model, wherein the compressed octree comprises a root node, child nodes, full leaves, and empty leaves;

traversing the compressed octree from a highest depth full leaf; and for each side S of each full leaf, performing steps of:
identifying an adjacent cuboid of the side S in the octree;
determining whether the adjacent cuboid corresponds to a leaf; and
rendering the side S based on the determining, wherein the rendering comprises:
when the adjacent cuboid corresponds to the leaf, rendering the side S when the leaf is empty and not rendering the side S when the leaf is full; and
when the adjacent cuboid does not correspond to the leaf, recursively splitting the side S into equal rectangles to obtain split sides S' and repeating, for each split side S', the steps performed for the side S.

8. The method according to claim 1, the method further comprising identifying a floating vertex among the rendered surfaces and splitting a surface including the floating vertex, wherein the identifying the floating vertex comprises:

building a vertex octree, wherein each leaf of the vertex octree corresponds to a vertex of the rendered surfaces; and traversing the vertex octree to identify the floating vertex, wherein the floating vertex is a vertex not lying at any intersection of edges.

9. A system for creating a 3 Dimensional (3D) model of an object suitable for 3D printing, the system comprising:

a processor;

one or more modules coupled to the processor, wherein any one of the modules from amongst the one or more modules is to:

define, by a processor, an initial cuboid of edge lengths Lx, Ly, Lz for creating the 3D model, wherein the initial cuboid implicitly comprises inner cuboids such that starting from the initial cuboid each cuboid is recursively splittable into eight identical inner cuboids, wherein the initial cuboid corresponds to the root node of an octree and the inner cuboids correspond to child nodes or leaves of the octree;

iteratively receive, through input from a user, a size of an inner cuboid to be modified and a selection of a point on the screen;

identify at least one inner cuboid to be modified based on the size of the inner cuboid and x, y, z coordinates of the point on the screen, received through user input, wherein the at least inner cuboid to be modified is related to an inner cuboid that is rendered at the selected point on the screen; and modify by marking the at least one inner cuboid as filled or empty; and wherein:

any one of the modules is to further create a compressed octree representing the 3D model by modifying the octree, for each input from the user, to incorporate the modification of the at least one inner cuboid in the compressed octree:

each leaf of the compressed octree corresponds to an inner cuboid that is either fully filled with a particular color or fully empty; and the one or more modules is to modify by:
replacing a node by a full leaf of a particular color when all the child nodes of the node correspond to filled inner cuboids of the particular color:
replacing a node by an empty leaf when all the child nodes of the node correspond to empty inner cuboids;
replacing a full leaf of the particular color by a node with eight child nodes when at least one of the eight child nodes of the full leaf corresponds to an inner cuboid that is marked as empty or as a different color; and
replacing an empty leaf by a node with eight child nodes when at least one of the eight child nodes of the empty leaf corresponds to an inner cuboid that is marked as filled.

10. The system according to claim 9, wherein each leaf of the compressed octree corresponds to an inner cuboid that is either fully filled or fully empty and wherein the one or more modules is to further modify by:

replacing a node by a full leaf when all the child nodes of the node correspond to filled inner cuboids;

replacing a node by an empty leaf when all the child nodes of the node correspond to empty inner cuboids;

replacing a full leaf by a node with eight child nodes when at least one of the eight child nodes of the full leaf corresponds to an inner cuboid that is marked as empty; and replacing an empty leaf by a node with eight child nodes when at least one of the eight child nodes of the empty leaf corresponds to an inner cuboid that is marked as filled.

11. The system according to claim 9, wherein the one or more modules is to further identify the at least one inner cuboid to be modified by:
   determining a ray from an origin outside the initial cuboid to the point; and
   considering the initial cuboid to be divided by mutually perpendicular planes forming sides of the inner cuboids of the octree, identifying at most three candidate inner cuboids by performing, in directions of each of the x, y, z coordinates, the steps comprising:
      ascertaining a nearest plane intersecting the ray at a minimal distance from the point and a farthest plane intersecting the ray at a maximal distance from the point;
      iteratively computing, for each plane from the nearest plane to the farthest plane, an intersection between the ray and the each plane, until the intersection corresponds to a point on an edge of an inner cuboid marked as full and then considered as a candidate inner cuboid;
      identifying a nearest cuboid of the at most three candidate inner cuboids, wherein the nearest cuboid of the at most three candidate inner cuboids has least distance between the corresponding intersection and the origin; and
      identifying the at least one inner cuboid to be modified, wherein the at least one inner cuboid to be modified is the inner cuboid of the size input by the user that contains the nearest of the at most three candidate inner cuboids.

12. The system according to claim 9, wherein the one or more modules is to further:
   identify a volume of inner cuboids from the initial cuboid wherein the volume is a cuboid made of inner cuboids of the same size; and
   clip the volume of inner cuboids from the initial cuboid for independent rendering and modification of the inner cuboids in the volume.

13. The system according to claim 12 wherein the one or more modules is to further move the volume of inner cuboids accordingly to a translation vector within the initial cuboid, wherein to move the volume of inner cuboids the one or more modules is to create a second compressed octree for the 3D model in which: inner cuboids which are outside the clipping volume are copied in the same position; and inner cuboids which are inside the clipping volume are copied in their translated position inside the clipping volume.

14. The system according to claim 9, wherein the one or more modules is to further project a texture provided by the user on the initial cuboid and retain the projection while the initial cuboid is modified to form the 3D model.

15. The system according to claim 9, with one or more of the one or more modules being a rendering module, wherein the rendering module is to render a 3 Dimensional (3D) model of an object suitable for 3D printing, wherein the rendering module is to:
   receive a file including a compressed octree representing the 3D model, wherein the compressed octree comprises a root node, child nodes, full leaves, and empty leaves;
   traverse the compressed octree from a highest depth full leaf; and
   for each side S of each full leaf, perform steps of:
      identifying an adjacent cuboid of the side S in the octree;
      determining whether the adjacent cuboid corresponds to a leaf; and
      rendering the side S based on the determining, wherein the rendering comprises:
         when the adjacent cuboid corresponds to the leaf, rendering the side S when the leaf is empty and not rendering the side S when the leaf is full; and
         when the adjacent cuboid does not correspond to the leaf, recursively splitting the side S into equal rectangles to obtain split sides S' and repeating, for each split side S', the steps performed for the side S.

16. The system according to claim 9, wherein the one or more modules is to further identify a floating vertex among the rendered surfaces and split a surface including the floating vertex, wherein to identify the floating vertex the one or more modules is to:
   build a vertex octree, wherein each leaf of the vertex octree corresponds to a vertex of the rendered surfaces; and
   traverse the vertex octree to identify the floating vertex, wherein the floating vertex is a vertex not lying at any intersection of edges.

* * * * *